United States Patent
Yanohara et al.

(10) Patent No.: US 8,065,916 B2
(45) Date of Patent: Nov. 29, 2011

(54) BEARING STATE DIAGNOSTIC APPARATUS

(75) Inventors: Naomitsu Yanohara, Aichi (JP);
Takashi Norihisa, Aichi (JP);
Tomoharu Ando, Aichi (JP)

(73) Assignee: Okuma Corporation, Aichi (JP)

( * ) Notice: Subject to any disclaimer, the term of this patent is extended or adjusted under 35 U.S.C. 154(b) by 459 days.

(21) Appl. No.: 12/289,726

(22) Filed: Nov. 3, 2008

(65) Prior Publication Data

US 2009/0114020 A1    May 7, 2009

(30) Foreign Application Priority Data

Nov. 6, 2007    (JP) ................. 2007-288163

(51) Int. Cl.
*G01M 13/04* (2006.01)
(52) U.S. Cl. ............... 73/593; 73/597; 73/602
(58) Field of Classification Search .......... 73/593, 73/579, 587, 599, 600, 602
See application file for complete search history.

(56) References Cited

U.S. PATENT DOCUMENTS

| | | | |
|---|---|---|---|
| 6,967,586 B2 * | 11/2005 | Narita et al. | 340/682 |
| 7,231,303 B2 * | 6/2007 | Griessler et al. | 702/34 |
| 7,435,004 B2 * | 10/2008 | Singh et al. | 384/448 |
| 7,559,240 B2 * | 7/2009 | Iwatsubo et al. | 73/593 |
| 7,813,906 B2 * | 10/2010 | Shiromaru et al. | 703/7 |

FOREIGN PATENT DOCUMENTS

| | | | |
|---|---|---|---|
| EP | 1731893 | * | 12/2006 |
| JP | 2005-062154 | | 3/2005 |
| JP | 2005-164314 | | 6/2005 |
| JP | 2007-010415 | | 1/2007 |

* cited by examiner

*Primary Examiner* — J M Saint Surin
(74) *Attorney, Agent, or Firm* — Jacobson Holman PLLC

(57) ABSTRACT

Provided is a bearing state diagnostic apparatus in which a sound generated from a bearing is detected by a sound sensor, a detected value of the sound sensor is compared with data which was previously formed, thereby diagnosing a state of the bearing, wherein at least one sound sensor is disposed at a position separated away from an outer surface of a cylindrical support body in which at least one bearing is accommodated, the corresponding bearing and sound sensor are in communication with each other through a detection sound propagation path.

11 Claims, 9 Drawing Sheets

| | CASE1 | CASE2 | CASE3 | CASE4 | CASE5 | CASE6 | CASE7 |
|---|---|---|---|---|---|---|---|
| Path of first line | ○ | ○ | ○ | × | × | × | × |
| Path of second line | ○ | ○ | × | × | ○ | × | ○ |
| Path of third line | ○ | × | × | × | ○ | ○ | × |
| Estimated abnormality | Normal | Path of third line (on the side of reference signal) / Path of third line (on the side of microphone) | Path of second line (on the side of microphone) / Path of third line (on the side of reference signal) / Path of third line (on the side of microphone) | All paths, microphone, reference signal generator | Path of first line (on the side of microphone) | Paths of first and second lines (on the side of reference signal) / Paths of first and second lines (on the side of microphone) | Path of first line (on the side of microphone) / Path of first line (on the side of reference signal) / Path of third line (on the side of microphone) |

Fig.9

BEARING STATE DIAGNOSTIC APPARATUS

BACKGROUND OF THE INVENTION

1. Field of the Invention

The present invention relates to a bearing state diagnostic apparatus which detects a sound generated from a ball bearing which supports a main shaft of a machine tool, and diagnoses a state of the ball bearing based on a detected value.

2. Description of Related Art Including Information Disclosed Under 37 CFR §§1.97 and 1.98

The bearings are used in rotation devices of many machines. Among the bearings, generally, the ball bearing includes an inner ring, an outer ring, a plurality of rolling elements, and a holder which holds the rolling elements at equal distances from one another, the inner ring rotates together with a shaft, and the outer ring is incorporated in a housing and is fixed. Lubricant oil is charged or supplied into the bearing, and while the main shaft is rotating, an oil film is formed between the inner ring, the outer ring and the rolling elements.

There is no problem when the bearing is normally rotating, but, in the bearing, if rotation failure or seizing occurs due to lubrication failure, invasion of foreign matter, wearing or overload, the machine cannot be operated normally in some cases. To avoid such a problem, it is necessary to pick up and diagnose the state of the bearing.

As an apparatus which picks up and diagnoses a state of the bearing, there are known an apparatus which uses a vibration sensor (see JP-A-2007-10415 for example), an apparatus which uses an ultrasound sensor or a microphone (see JP-A-2005-164314 for example) and an apparatus which uses an AE sensor (see JP-A-2005-62154 for example).

To pick up a state of a bearing, since an S/N ratio is increased, it is preferable that a sensor is mounted directly on the bearing or in the vicinity of the bearing as close as possible. In the apparatus shown in JP-A-2007-10415 in which a state of the bearing is diagnosed using a sensor capable of detecting acceleration, to increase the S/N ration, it is necessary that the sensor is mounted directly on the bearing or incorporated at a position where the sensor is closer to the bearing in the vicinity such as a housing or a spacer which is a part near the bearing. In this case, as compared with a similar constitution machine in which no sensor is incorporated at the time of machine assembling, it is necessary to carryout the wiring processing and to fix the sensor, and the number of assembling steps is generally increased. When the sensor is out of order and it is necessary to replace the sensor by another sensor, there is a possibility that much time must be consumed. Since it is necessary to select a smaller sensor depending on the size or structure of the machine, there are problems that the sensor becomes expensive, satisfactory performance cannot be obtained, the number of kinds of selectable sensors is small. Further, when the machine includes a plurality of bearings, since the same number of sensors as that of the bearings is required, there is a problem that the apparatus becomes expensive, and the constituent parts of the apparatus and machine become complicated. However, if the position where the sensor is mounted is separated from the bearing or from a position near the bearing, and if the sensor is incorporated on an outer periphery or an end surface of the housing, the S/N ratio is reduced although it is easy to exchange the sensor or the constituent parts can be simplified. In this case, it naturally becomes difficult to mount a sensor on each of the bearings, a plurality of bearings are diagnosed using one sensor, and when a machine is constituted by a plurality of bearings having the same or similar specifications, there is a problem that it is difficult to determine which bearing has a problem.

In JP-A-2005-164314, even the apparatus which diagnoses a state of a bearing using a sensor capable of detecting a sound measures variation in a pressure transmitted in the air. Therefore, the position of the sensor is separated away from the bearing, the sensor receives influence of a sound around the machine, a sound generated from other than bearing and an air temperature around the machine, and there is a possibility that the S/N ratio is reduced. Especially in a case of a supersonic sensor whose measurable frequency range is high (20 kHz or higher), many sensors has high directivity, and as the measurable frequency sensitivity becomes higher, the propagation distance of sound becomes shorter. Therefore, it is necessary to mount a sensor near a rolling surface of the bearing.

SUMMARY OF THE INVENTION

It is an object of the present invention to solve the above problems, and to provide a bearing state diagnostic apparatus which has a simple structure and which can be assembled easily.

The present invention provides a bearing state diagnostic apparatus in which a sound generated from a bearing is detected by a sound sensor, a detected value of the sound sensor is compared with data which was previously formed, thereby diagnosing a state of the bearing, wherein at least one sound sensor is disposed at a position separated away from an outer surface of a cylindrical support body in which at least one bearing is accommodated, the corresponding bearing and sound sensor are in communication with each other through a detection sound propagation path.

In the above bearing state diagnostic apparatus, the number of the bearing may be two or more, the number of sound sensor may be one, and the number of the detection sound propagation path which brings the corresponding bearing and sound sensor into communication with each other may be the same as the number of bearings.

In the above bearing state diagnostic apparatus, the number of the bearing may be one, the number of sound sensor may be two or more, and the number of the detection sound propagation path which brings the corresponding bearing and sound sensor into communication with each other may be the same as the number of sound sensors.

In the above bearing state diagnostic apparatus, there may be a plurality of pairs of bearings and sound sensors, and the number of the detection sound propagation path which brings the corresponding bearing and sound sensor into communication with each other may be the same as the number of pairs of the bearing and sound sensor.

Each of the bearing state diagnostic apparatuses of the present invention includes a function for diagnosing a state of a bearing by a sound transmitted from a path provided in the bearing. For example, a path extending from a position near rolling elements of the bearing to outside of a machine is provided, and a sensor capable of detecting a sound of a frequency which is desired to be diagnosed is mounted on an end of the path. A sound generated by rotating a rotation portion supported by the bearing is transmitted in the path, information detected by the sensor capable of detecting a sound is collected, and the state of the bearing is diagnosed. This is compared with a result of detection obtained from the sensor capable of detecting a sound when an oil film on the bearing is normally rotating, a sound when a rolling surface, the rolling elements, damage of a holder, or a contact portion between the rolling surface and the rolling elements runs out is different and thus, it is possible to diagnose the bearing.

Therefore, according to the present invention, if a sound transmitting through the path provided in the bearing is diagnosed, there is an effect that the maintenance performance when the sensor is out of order is enhanced, the mechanical structure is simplified, the S/N ratio is enhanced and the diagnosis precision is enhanced. It is possible to switch between paths which connect the bearing and the sensor. Therefore, there is an effect that the number of sensors can be reduced, the structures of the machine and the device can be simplified, and diagnosis precision is enhanced by detecting using sensors having different specifications. If the sensor generates a reference signal, it is possible to detect the trouble of the sensor and to detect clogging of the path, and it is possible to reliably diagnose.

In the bearing state diagnostic apparatus in which the number of sound sensors is two or more, it is preferable that each of the plurality of sound sensors can detect sounds in a frequency band different from the other sound sensors.

As compared with a case in which only a sensor having one kind of detectable frequency is used, it is possible to measure a wider range of frequency with excellent sensitivity. For example, the diagnostic apparatus has a sensor having excellent sensitivity in a low frequency band and a sensor having excellent sensitivity in a high frequency band and switches the sound generated from the bearing to paths of the respective sensors using the device capable of switching between the paths, and carries out the detection, thereby diagnosing bearings of different specifications, different operation states, different abnormalities of the bearings etc., and enabling to more reliably diagnose.

In the bearing state diagnostic apparatus in which the number of detection sound propagation paths is two or more, it is preferable that the apparatus further includes switch which switches between detection sound propagation paths so that any one of them can be selected.

The switching device can switch between the paths which are in communication with the sensors, and states of the bearings, the sensors and the paths can be diagnosed. For example, when the rotating portion of the machine is supported by two or more bearings, paths extending from positions near the bearing to the device capable of switching between the paths are independent from each other for each of the bearings. The paths from the device capable of switching between the paths to the sensors are one common path, a sensor is mounted on the end of the path, and if the paths are switched, the plurality of bearings can be diagnosed by one sensor. With this configuration, the number of sensors can be reduced, and also the structures of the machine and device can be simplified. The paths extending from positions near the bearings to the device capable of switching between the paths are independent from each other for each of the bearings, but paths from the device capable of switching between the paths to the sensors are a combination of paths having different lengths. With this configuration, different frequencies can be diagnosed using one sensor.

In each of the bearing state diagnostic apparatuses, it is preferable that at least a portion of the detection sound propagation path is constituted by a pipe, and the pipe is of multiple-layer structure including at least one of a vibration isolation material layer and a heat insulator layer.

It is possible to easily constitute a path which does not easily receive influence other than a sound generated from the bearing. If a path of three layers using a heat insulator layer, a vibration isolation material and a steel material is used as the cylindrical pipe, it is possible to reduce influences such as the temperature rise caused by heat generated in each part of the machine, vibration and sound generated from other than the bearing to be diagnosed, temperature variation around the machine, and sound generated around the machine. Both drilled holes formed in the cylindrical pipe and a housing or a space which is a peripheral part of the bearing, or outside of the machine from near the bearing are combined, it is possible to constitute an optimal path in accordance with structures of the machine and the device.

Further, in each of the bearing state diagnostic apparatuses, it is preferable that the apparatus further includes a temperature sensor which detects a temperature in the detection sound propagation path.

It is possible to calibrate a value of a sound transmitted from the bearing in accordance with temperature variation in each path. For example, if a sensor capable of detecting a temperature is mounted in a tube constituting a path and a temperature is detected, and if variation in the value by the influence of velocity of sound which is varied by temperature is taken into account, it is possible to reliably diagnose.

In each of the bearing state diagnostic apparatuses, it is preferable that the apparatus further includes a signal generating unit which generates a sound of specific frequency as a reference signal of the sound sensor, and a propagating unit which propagates a sound generated by the signal generating unit to the bearing.

A reference signal is sent to the path, and a signal of the sensor in that case is detected, it is compared with a measurement signal when the bearing, the sensor and the path are normal, and it is possible to diagnose abnormality of the bearing, trouble of the sensor and clogging of path. For example, before measurement is carried out, a reference signal is detected, this value and a value when the bearing is rotating are compared with each other, and abnormality of the bearing is detected by the difference. Alternatively, in a state where a path to which a reference signal is transmitted and a path to which a sound of the bearing is transmitted are brought into communication with each other, a reference signal is generated, a signal detected by the sensor and a signal at the time of normal state are compared with each other, abnormality of the path or the sensor is detected, and it is possible to diagnose a state of a bearing reliably.

Further, it is preferable that the propagating unit includes a signal sound propagation path, lubricant oil is supplied to the bearing from one of the detection sound propagation path and the signal sound propagation path, and lubricant oil supplied to the bearing is discharged from the other one of the detection sound propagation path and signal sound propagation path.

The detection sound propagation path, the signal sound propagation path and the path through which lubricant oil is supplied to the bearing are used commonly. With this configuration, the path can be simplified. When a supply method of lubricant oil to a bearing is brought into an oil air lubricating method, a path through which oil air is supplied and a path through which a sound is transmitted are used commonly. With this configuration, the apparatus can be simplified as compared with a case in which paths through which a sound of a bearing and a reference signal are transmitted are independently provided.

In each of the bearing state diagnostic apparatuses, it is preferable that the apparatus further includes a temperature sensor which detects a temperature in the signal sound propagation path.

Like the bearing state diagnostic apparatus having a temperature sensor which detect a temperature of the detection sound propagation path, it is possible to accept temperature variation in the path.

BRIEF DESCRIPTION OF THE DRAWINGS

FIG. 9 is a table showing detection results and estimated abnormalities of the third embodiment.

DETAILED DESCRIPTION OF PREFERRED EMBODIMENTS

Embodiments of the present invention will be described below with reference to the drawings.

Figure 1:
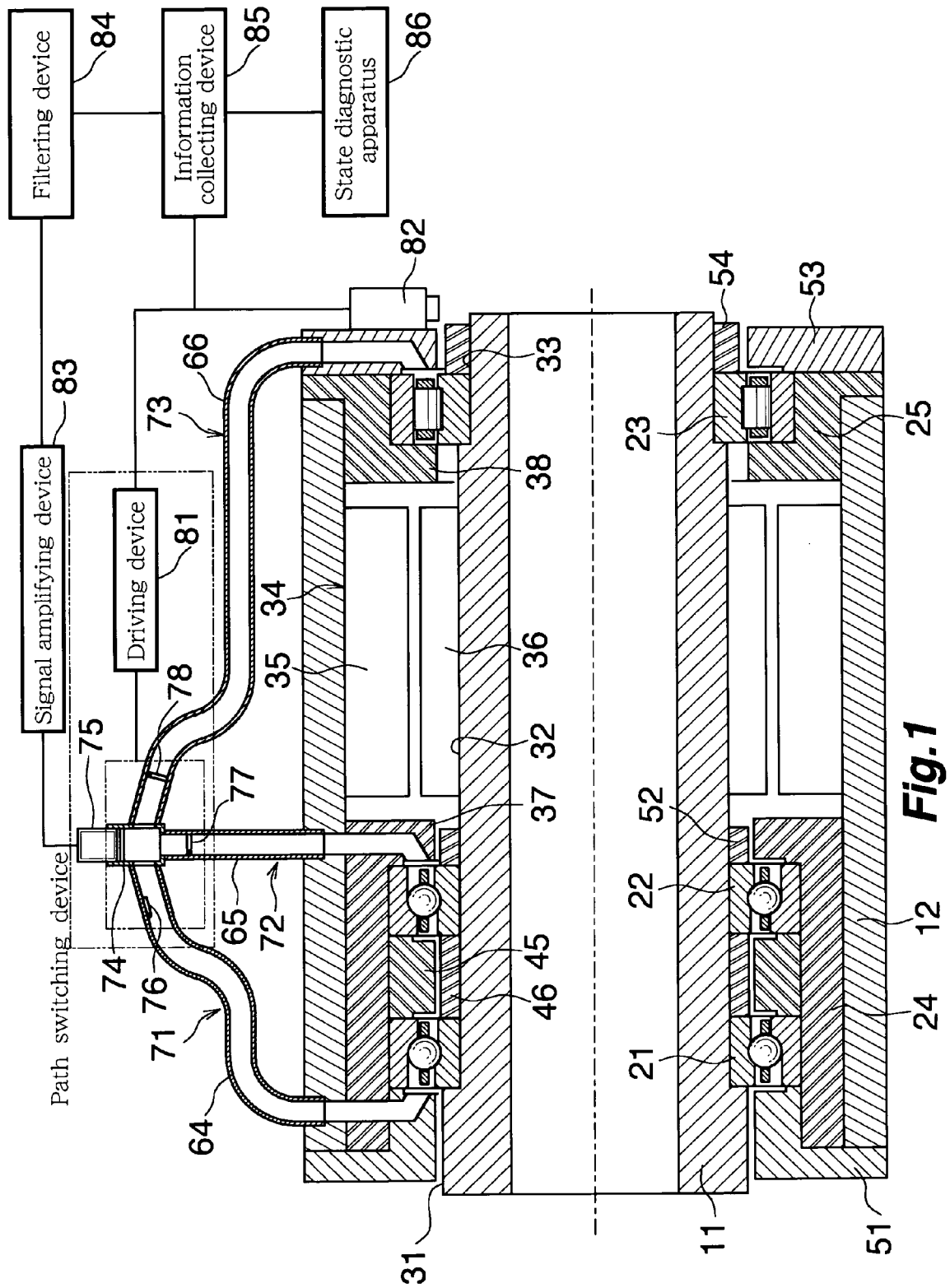
FIG. 1 is a schematic block diagram of a state diagnostic apparatus according to a first embodiment of the present invention.

In the following description, concerning the terms "left" and "right", the left side in FIG. 1 is left, and the right side in FIG. 1 is right. The left side is a front side, and the right side is a rear side.

First Embodiment

Referring to FIG. 1, a main shaft device includes a horizontal hollow main shaft 11, a horizontal cylindrical sleeve 12 surrounding the main shaft 11, a first bearing 21 and a second bearing 22 which support a left side of the main shaft 11 at a distance from each other in its axial direction, a third bearing 23 which supports a right side of the main shaft 11, a left housing 24 which surrounds the first bearing 21 and the second bearing 22 and which is fixed to an inner surface of the sleeve 12, and a right housing 25 which surrounds the third bearing 23 and which is fixed to the inner surface of the sleeve 12.

An outer surface of the main shaft 11 is provided with a large-diameter portion 31, an intermediate-diameter portion 32 and a small-diameter portion 33 from left to right through steps. These diameter portions are continuously formed together.

A stator 35 of a motor 34 is fixed to an inner surface of the sleeve 12 between the second bearing 22 and the third bearing 23. A rotor 36 of the motor 34 is fixed to an outer surface of the main shaft 11 in correspondence with the stator 35.

A left inward annularly projecting portion 37 is provided on a right end of an inner surface of the left housing 24. A right inward annularly projecting portion 38 is provided on a left end of an inner surface of the right housing 25.

Figure 2:
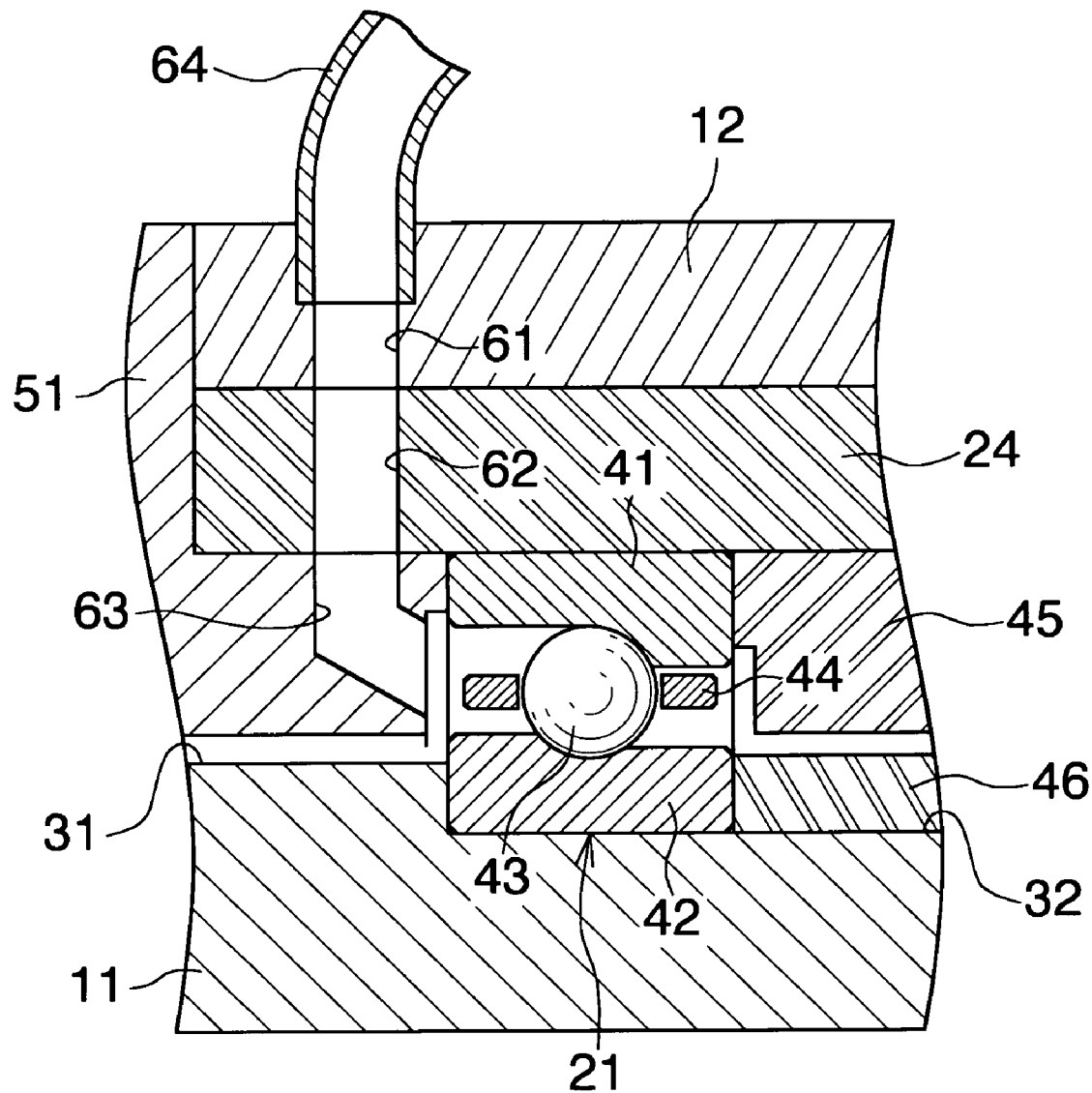
FIG. 2 is an enlarged view of a bearing which is diagnosed by the state diagnostic apparatus.

FIG. 2 shows an upper portion of the first bearing 21 in detail. The first bearing 21 includes an outer ring 41 fixed to an inner surface of the left housing 24, an inner ring 42 fixed to an outer surface of the main shaft 11, a plurality of rolling elements 43 interposed between the outer ring 41 and the inner ring 42, and a holder 44 which rotates together with the rolling elements 43 while using the inner surface of the outer ring 41 as a guide surface, and which holds the rolling elements 43 at constant distances from one another.

Referring again to FIG. 1, an outer ring spacer 45 fixed to an inner surface of the left housing 24 is interposed between the first bearing 21 and the outer ring 41 of the second bearing 22. An inner ring spacer 46 fixed to the outer surface of the main shaft 11 is interposed between the inner rings 42 of both the bearings 21 and 22.

A left opening of the sleeve 12 is provided with a left press lid 51. The outer rings 41 of the first bearing 21 and the second bearing 22 are pressed against the left inward annularly projecting portion 37 together with the outer ring spacer 45 by the left press lid 51. A left press nut 52 is threadedly fitted to a right side of the second bearing 22. The inner rings 42 of the first bearing 21 and the second bearing 22 are pressed against steps of the large-diameter portion 31 and the intermediate-diameter portion 32 together with the inner ring spacer 46 by the left press nut 52. A right opening of the sleeve 12 is provided with a right press lid 53. The outer ring 41 of the third bearing 23 is pressed against the right inward annularly projecting portion 38 by the right press lid 53. A right press nut 54 is threadedly fitted to a right side of the third bearing 23. The inner ring 42 of the third bearing 23 is pressed against a step between the intermediate-diameter portion 32 and the small-diameter portion 33 by the right press nut 54.

Referring again to FIG. 2, on a portion immediately on the left side of the first bearing 21, a first outer through hole 61 is formed in the sleeve 12, a first intermediate through hole 62 is formed in the left housing 24, and a first inner through hole 63 is formed in the left press lid 51 such that these holes 61 to 63 are straightly continuously formed in inward and outward directions. One end of a first pipe 64 is connected to an outer end opening of the first outer through hole 61. Referring to FIG. 1, one end of a second pipe 65 is connected to an outer opening of a through hole (this portion is not described in detail) provided on a portion immediately on the right side of the second bearing 22. One end of a third pipe 66 is connected to a third through hole formed in just a right side portion of the third bearing 23. The first outer through hole 61, the first intermediate through hole 62, the first inner through hole 63 and the first pipe 64 form a series of first detection sound propagation path 71. The second through hole and the second pipe 65 form a series of second detection sound propagation path 72. The third pipe 66 forms a series of third detection sound propagation path 73.

The other ends of the first pipe 64, the second pipe 65 and the third pipe 66 are connected to and collected at a collection pipe 74. The collection pipe 74 includes a sound sensor 75. The sound sensor 75 is an ultrasound sensor whose detectable frequency is near a specific frequency of 20 kHz or higher.

The first pipe 64 includes a first open/close operation valve 76, the second pipe 65 includes a second open/close operation valve 77, and the third pipe 66 includes a third open/close operation valve 78.

The first to third open/close operation valves 76, 77 and 78 are driven by a driving device 81. The right press lid 53 includes a speed sensor 82 for detecting a rotation speed of the main shaft 11.

Information detected by the sound sensor 75 is amplified by a signal amplifying device 83, the information is filtered by a filtering device 84, and is recorded by an information collecting device 85. At the same time, information of the driving device 81 and the speed sensor 82 is recorded by the information collecting device 85, and states of the bearings 21 to 23 are diagnosed by a state diagnostic apparatus 86 using those pieces of information.

Figure 3:
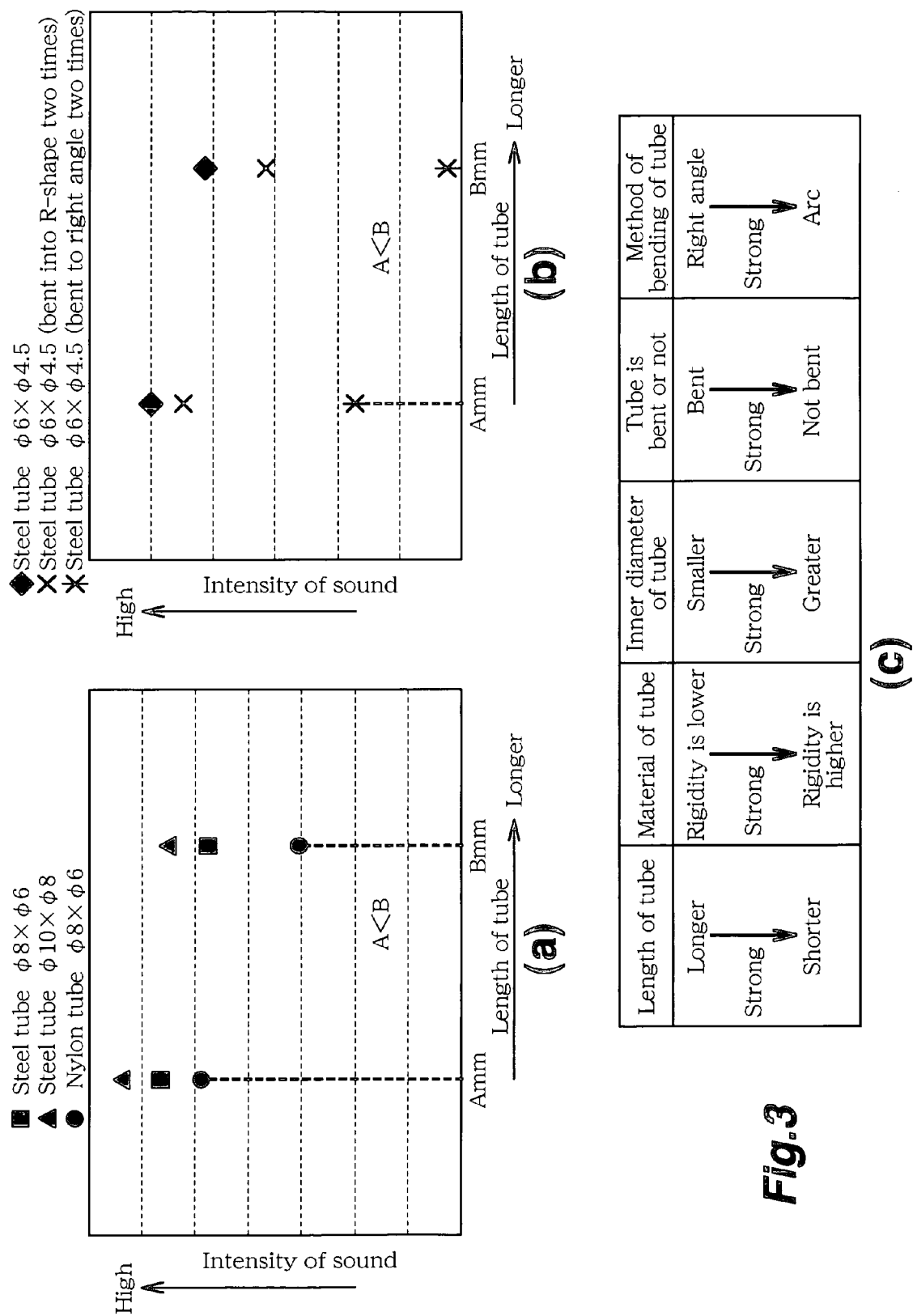
FIGS. 3A to 3C are graphs and table showing a relation between a length of a path of the state diagnostic apparatus, diameter thereof, and material thereof.

Referring to FIGS. 3A, 3B and 3C, a path which is adjusted such that a sound of about specific frequency can be detected will be described. A graph shown in FIG. 3A shows an example indicating a relation between an outer diameter and an inner diameter of a cylindrical tube, a length of the tube and intensity of a sound when a sound in a specific frequency is transmitted into the cylindrical tube. A lateral axis shows a tube length, and a vertical axis shows the intensity of a sound. In data which is plotted in the graph, a case of two kinds including tube lengths A and B (A<B), a case in which there are two kinds of materials of the tube, i.e., nylon material and steel material, and a case in which there are two kinds of an outer diameter and an inner diameter of the tube, i.e., φ8×φ6 and φ10×φ8 are compared with each other. A graph shown in FIG. 3B shows an example indicating a relation between the tube length, a bending method of the tube and the intensity of a sound when a sound in a specific frequency range is transmitted into the cylindrical tube. The lateral axis shows the tube length and the vertical axis shows the intensity of a sound. In data which is plotted in the graph, a case of two kinds including tube lengths A and B (A<B), a case in which there is one kind of material of the tube, i.e., copper material, and a case in which there is one kind of an outer diameter and an inner diameter of the tube, i.e., φ6×φ4.5 are compared with each other. In the bending method of the tube, a tube which is not bent, a tube which is bent into an R-shape, and a tube which is bent to a right angle are compared with each other. FIG. 3C is a table in which the intensity of a sound is indicated under different conditions by the graphs shown in FIGS. 3A and 3B. That is, there are tendencies that as the tube length is shorter, the sound intensity becomes higher, steel material having higher rigidity than the nylon material has higher sound intensity; as the inner diameter of the tube is greater, the sound intensity becomes higher; as the tube is less bent, the sound intensity becomes higher; and when the tube is bent, the sound intensity becomes higher if the tube is bent into an arc as compared with a case where the tube is bent at right angles. Therefore, in this embodiment, three bearings are formed with different paths. Taking this fact into account, it is necessary that lengths and inner diameters of the pipes, the diameters of the holes, the number of bent portions, the bending methods, and the like are as close as possible. Especially attention must be paid to the lengths because the columnar in the path resonates depending on frequency to be detected. The sensor shown in the embodiment is the sound sensor 75 whose detectable frequency is near a specific frequency of 20 kHz or higher. Therefore, a signal transmitted from the bearing may be amplified by setting the length of the path to the length of the columnar which resonates with that frequency.

Figure 4:
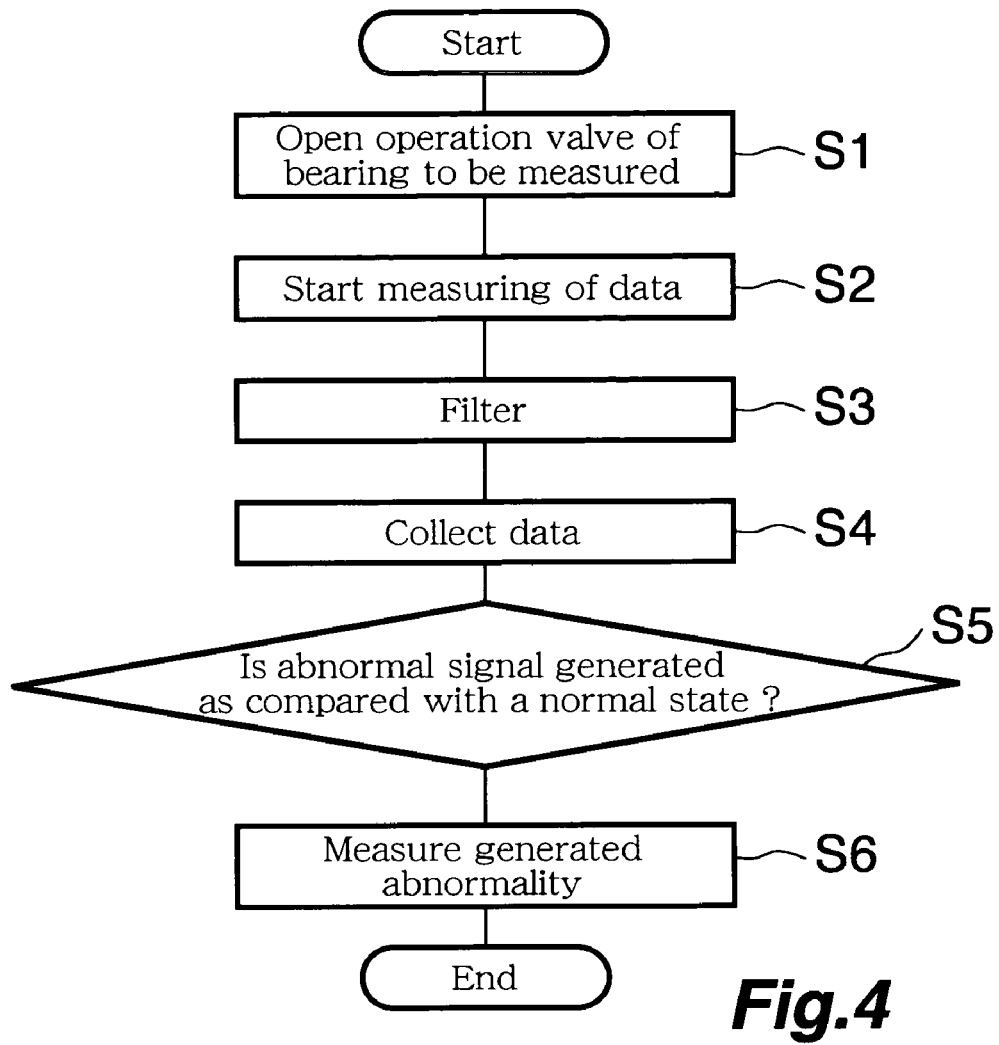
FIG. 4 is a flowchart showing a flow of processing in the state diagnostic apparatus shown in FIG. 1.

Next, a state diagnosis according to the first embodiment will be described with reference to a flowchart shown in FIG. 4, in addition to FIGS. 1 and 2.

First, while the main shaft 11 is rotating, operation valves 76 to 78 of the bearings 21 to 23 to be measured in step S1 are opened. In FIG. 1, in a state where the operation valve 76 of the first bearing 21 is opened, and the operation valves 77 and 78 of the second and third bearings 22 and 23 are closed. A sound generated from the first bearing 21 is transmitted to the sound sensor 75 from the first path 71.

In step S2, detection of data is started, a signal detected by the sound sensor 75 is amplified by the signal amplifying device 83, and the process proceeds to step S3.

In step S3, the signal of the sound sensor 75 amplified by the signal amplifying device 83 is filtered. In this embodiment, since the frequency of the sound sensor 75 is in the vicinity of specific frequency of 20 kHz or higher. Therefore, band pass filter processing near that frequency is carried out, and the process proceeds to step S4.

In step S4, a signal of the sound sensor 75 is collected by the information collecting device 85 at sampling cycle and detection time determined by the frequency. At the same time, information of the operation valves 76 to 78 and information of the speed sensor 82 are also collected, and the process proceeds to step S5.

In step S5, a state of the bearing is determined based on the collected signals and information. First, an RMS value of the collected signals of the sound sensor 75 is calculated, and this is compared with a threshold value determined from the RMS value at a normal time which is previously recorded for each of rotation speeds. As a result of comparison, if the collected signal is greater than the threshold value, it is determined that the state is abnormal. To determine detailed phenomenon of the abnormality, FFT processing is carried out, this value is compared with preset rotation frequency component, a rolling element passage component, an outer ring flaw component, an inner ring flaw component, a rolling element flaw, a holder flaw component, a lubrication failure component on a rolling surface, a lubrication failure component of the holder and the like, and the process proceeds to step S6. No abnormal signal is generated, the process returns to step S1 again, the operation valve 76 of the measured first bearing 21 is closed, the operation valve 77 or 78 of the second bearing 22 or the third bearing 23 which is then measured is opened, and the process proceeds to step S2.

In step S6, if it is determined that abnormality is generated, the abnormality generated in the bearings 21 to 23 is displayed by the state diagnostic apparatus 86, an alarm signal is generated, and the rotation of the main shaft 11 is stopped. The operation in the flowchart in FIG. 4 may always carry out the state diagnosis during rotation of the main shaft 11, or the state diagnosis may be carried out at every specific sampling time.

In the first embodiment, the sensor capable of detecting a sound is the supersonic sensor whose detectable frequency is near a specific frequency of 20 kHz or higher, but a microphone whose detectable frequency is in a wide range from a few Hz to a few tens of Hz may be used. In this case, however, it is necessary to pay attention to resonance caused by length of the columnar in the path. If a microphone is mounted in a path whose both ends are opened as in this embodiment, resonance is generated at a specific frequency depending on length of the columnar of the path. When the length of the columnar is 200 mm and the temperature is 25° C. for example, since resonance is generated at "2n−1" (n=1, 2, . . . ) times of about 433 Hz, it is necessary to change the length of the path if a frequency to be detected is near a frequency at which resonance is generated. On the other hand, it is also possible to adjust and amplify the length of the path such that a frequency to be detected is close to the frequency at which resonance is generated. Further, the path may be changed to another path having a different length so that a wider frequency can be detected (not shown). It is also possible to manually or automatically move the position of the microphone in the longitudinal direction of the path so that a wide frequency can be detected (not shown).

In the first embodiment, the operation valves 76 to 78 of the respective bearings are independently opened, and a sound generated from the bearing is transmitted to the sound sensor 75. However, if the three or two of the operation valves 76 to 78 are opened and then diagnosed and abnormality is generated, the operation valves 76 to 78 of the respective bearings may independently be opened and the sound may be diagnosed. With this configuration, it is possible to operate the main shaft while always diagnosing the states of all of the bearings 5, and the algorithm of the operation can be simplified.

Figure 5:
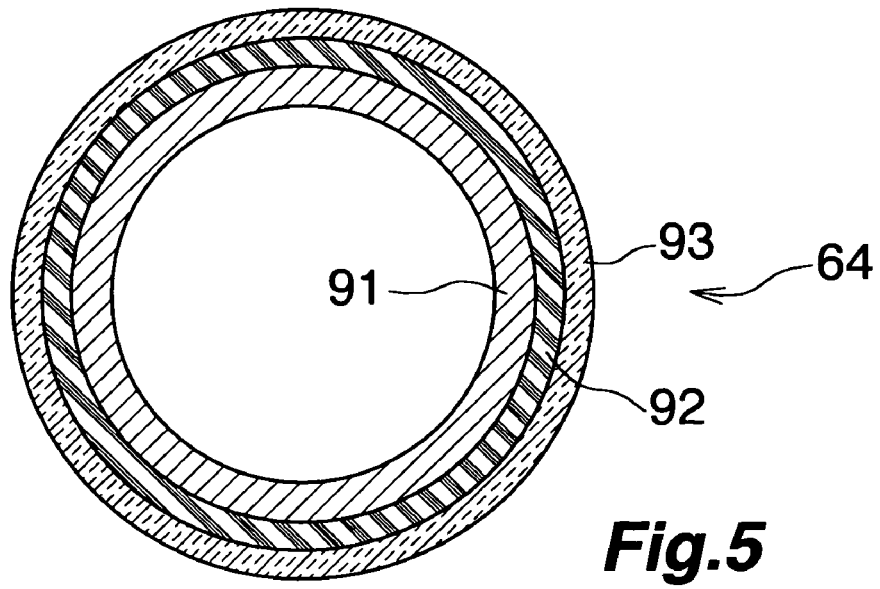
FIG. 5 is a sectional view of a pipe of three layer structure constituting the path.

The paths 71 to 73 shown in FIGS. 1 and 2 include a series of through holes and pipes. As shown in FIG. 5, it is preferable that the first pipe 64 constituting the pipes has three layers, i.e., a steel material layer 91, a vibration isolation material layer 92 and a heat insulator layer 93. With this configuration, it is possible to prevent influence of the temperature of the machine, vibration and sound generated from other than the bearings and the temperature and sound around the machine from being exerted.

Second Embodiment

Figure 6:
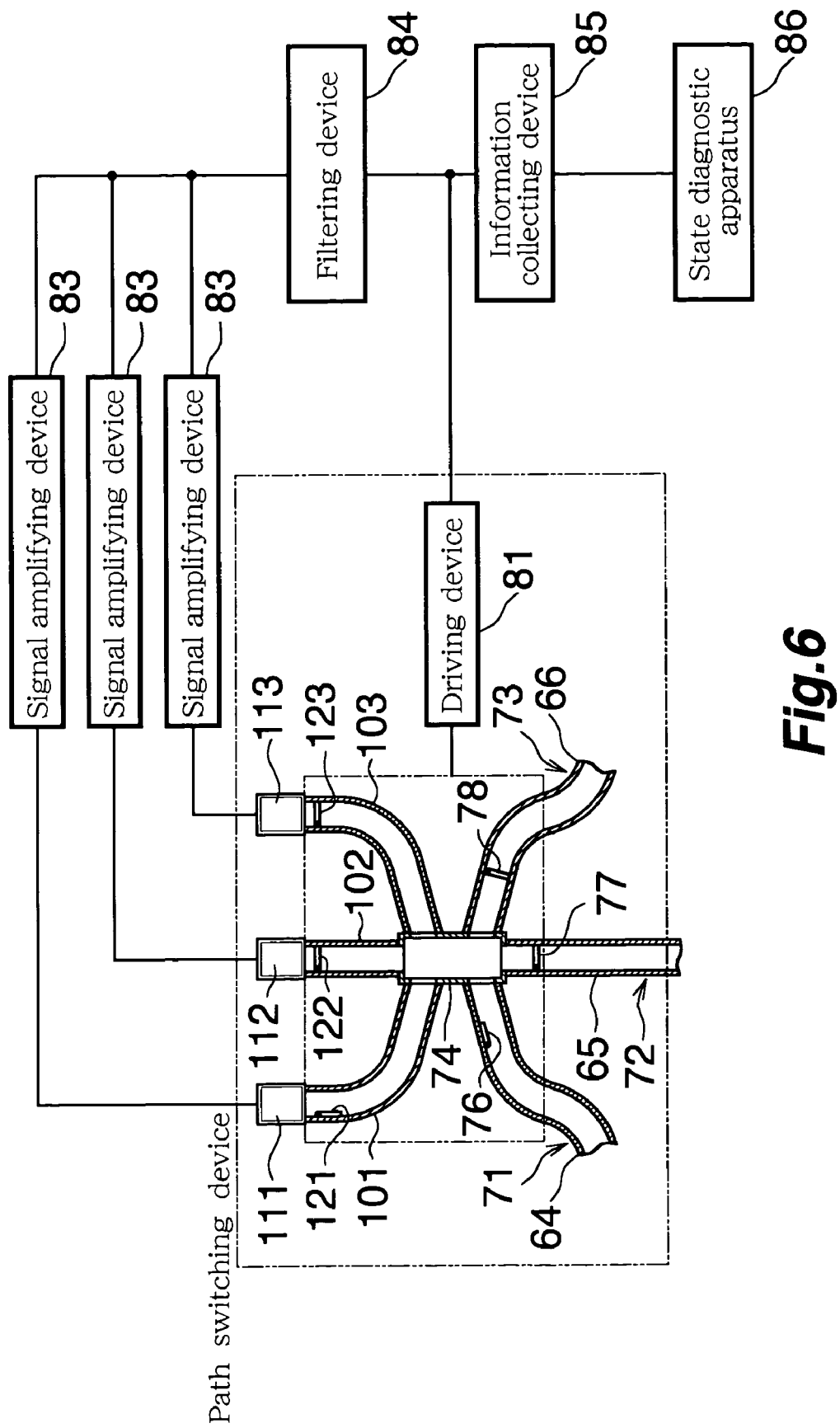
FIG. 6 is a schematic block diagram of a state diagnostic apparatus according to a second embodiment.

In a second embodiment shown in FIG. 6, the first to third three detection sound propagation paths 71 to 73 collected in the first embodiment are again branched into three paths, and a sensor is provided in each of the branched paths. In FIG. 6, same reference numerals are denoted for the corresponding components to those in the first embodiment in the second embodiment, and the description thereof will not be given here.

Fourth to sixth three pipes 101 to 103 are connected to the collection pipe 74. The pipes 101 to 103 include fourth to sixth sound sensors 111 to 113 and fourth to sixth open/close operation valves 121 to 123, respectively. Signals from the sound sensors 111 to 113 are amplified by signal amplifying device 83 in each sensor.

Detectable frequencies of the sound sensors 111 to 113 may be the same or different from each other. A microphone in which detectable frequency is in a wide range from a few Hz to a few tens of Hz may be used. In that case, sounds from the bearing can be diagnose independently or at the same time widely and with excellent sensitivity, and it is possible to diagnose a rotation frequency component, a rolling elements passage component, an outer ring flaw component, an inner ring flaw component, a rolling elements flaw, and a holder flaw component using the microphone, and to diagnose lubrication failure by the sound sensor.

In the second embodiment also, it is necessary to pay attention to the resonance caused by the length of the columnar in the path. When sound sensors having different detectable frequency ranges are combined, it is necessary to adjust the length of the path suitable for the sensors while taking the amplification of signals by resonance into consideration. In the embodiment, a plurality of sensors having the same detectable frequencies may be combined and a wider frequency may be detected by setting the lengths of the paths to different values. It is also possible to manually or automatically move the position of the sensor in the longitudinal direction of the path so that a wide frequency can be detected (not shown).

Like the structure shown in FIG. 5, the pipe constituting the path shown in FIG. 6 may have three layers to prevent influence of the temperature of the machine, vibration and sound generated from other than the bearings and the temperature and sound around the machine from being exerted.

Third Embodiment

Figure 7:
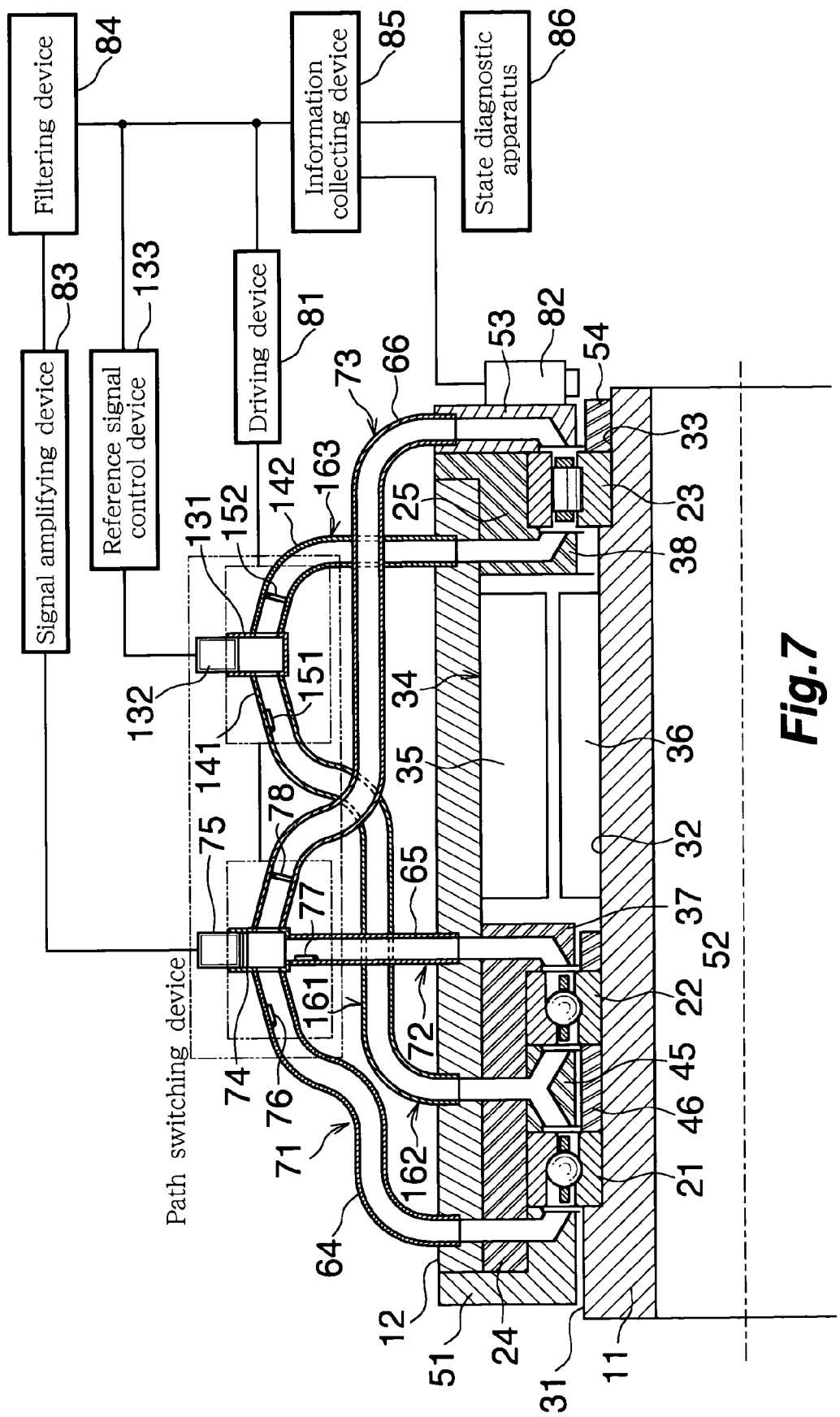
FIG. 7 is a sectional view of a state diagnostic apparatus according to a third embodiment taken along a longitudinal direction thereof and shows a peripheral apparatus.

A third embodiment will be described below with reference to FIG. 7.

In the third embodiment, reference signal of a specific frequency is transmitted to the bearings 21 to 23 shown in the first embodiment. Like the second embodiment, in FIG. 7, same reference numerals are denoted for the corresponding components to those in the first embodiment in the third embodiment, and the description thereof will not be given here.

A branched pipe 131 is disposed in parallel to the collection pipe 74. The branched pipe 131 includes a reference signal generating device 132.

The reference signal generating device 132 is operated by a reference signal control device 133. The reference signal is determined by specification of the sound sensor 75. For example, in the case of a sound sensor whose detectable frequency is near a specific frequency of 20 kHz or higher, a device which generates a reference signal of that frequency is used. When a microphone whose detectable frequency is in a wide range from a few Hz to a few tens of Hz is used, a device which generates a signal of specific frequency in a range from a few Hz to a few tens of Hz is used. Since the sound sensor 75 is used in this embodiment, a device which generates a reference signal of a specific frequency that can be detected by the sound sensor 75 is used.

One ends of a seventh pipe 141 and an eighth pipe 142 are connected to the branched pipe 131. The seventh pipe 141 includes a seventh open/close operation valve 151, and the eighth pipe 142 includes an eighth open/close operation valve 152. Although it is not described in detail, the other end of the seventh pipe 141 is opened on the side of the first and second bearings 21 and 22 by the through holes in accordance with the through holes constituting the first to third detection sound propagation paths 71 to 73. However, the through hole are branched into two, one of them is opened on the right side of the first bearing 21, and the other is opened on the left side. In the same manner, the other end of the eighth pipe 142 is opened on the left side of the third bearing 23 through the through holes.

The seventh pipe 141 and one of the branched through holes form a first signal sound propagation path 161. The seventh pipe 141 and the other branched through hole form a second signal sound propagation path 162. The eighth pipe 142 and the branched through hole form a third signal sound propagation path 163.

In the third embodiment, like the first embodiment, in order to transmit a stable reference signal to the bearings 21 to 23, it is necessary that lengths of paths, inner diameters of the pipes, the diameters of the holes, the number of bent portions and the bending methods, and the like are as close as possible. Especially attention must be paid to the lengths like the first embodiment because the columnar in the path resonates depending on frequency of the reference signal to be transmitted to the bearings 21 to 23. The sensor shown in the embodiment is the sound sensor 75. Therefore, the reference signal to be transmitted to the bearings 21 to 23 may be amplified by setting the length of the path to the length of the columnar which is resonated at that frequency.

Figure 8:
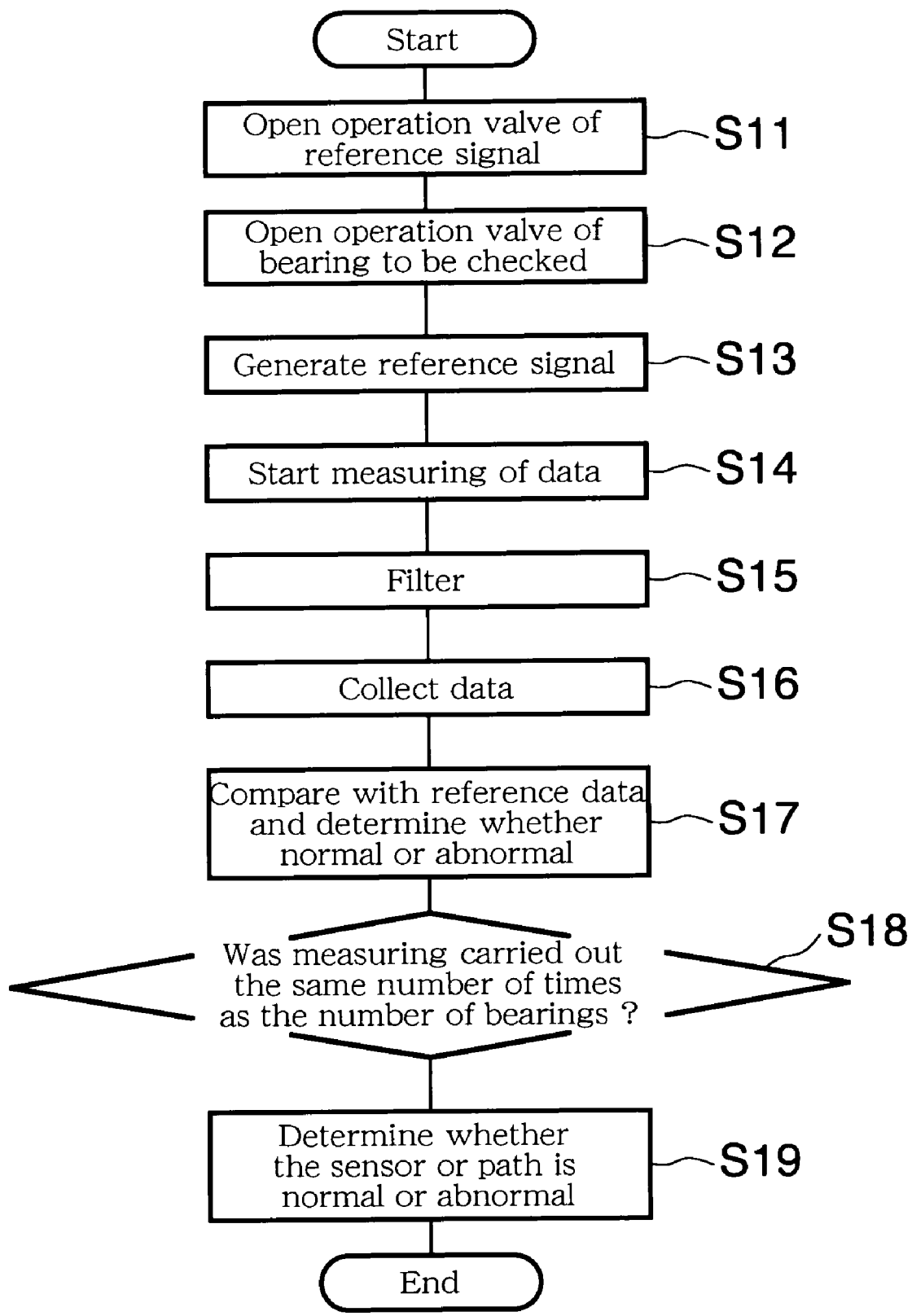
FIG. 8 is a flowchart showing a flow of processing in the state diagnostic apparatus of the third embodiment.

Next, a bearing diagnosis function in the third embodiment will be described with reference to FIGS. 7 to 9.

First, in step S11, the operation valves 151 and 152 are opened to transmit a reference signal to the bearings 21 to 23, and the process proceeds to step S12. In FIG. 7, the operation valve 151 which transmits a reference signal to the first and second bearings 21 and 22 is opened. The operation valve 152 of the third bearing is closed.

In step S2, if the operation valves 76 to 78 of the bearings 21 to 23 to be diagnosed are opened, a reference signal is transmitted to the sound sensor 75 from a gap between the outer ring 41 and the inner ring 42 of the bearings 21 to 23 through the detection sound propagation paths 71 to 73. In FIG. 7, the operation valves 76 and 77 of the first and second detection sound propagation paths 71 and 72 of the first and second bearings 21 and 22 are opened, and the operation valve 78 of the third bearing 23 is closed. That is, in this state, the first and second detection sound propagation paths 71 and 72 of the first and second bearings 21 and 22, or the sound sensor 75 can be diagnosed.

In step S13, the reference signal generating device 132 generates a reference signal, the reference signal is transmitted to the sound sensor 75 from the first and second signal sound propagation paths 161 and 162 and from a gap between the outer ring 41 and the inner ring 42 of the first and second bearings 21 and 22 through the first and second detection sound propagation paths 71 and 72, and the process proceeds to step S4. In the third embodiment, since the sound sensor 75 whose detectable frequency is near the specific frequency of 20 kHz or higher is used, the reference signal has that frequency.

In step S14, detection of data is started, a signal detected by the sound sensor 75 is amplified by the signal amplifying device 83, and the process proceeds to step S15.

In step S15, the amplified signal of the sound sensor 75 is filtered. In the third embodiment, since the sound sensor 75 whose detectable frequency is near the specific frequency of 20 kHz or higher is used, band pass filter processing at that frequency is carried out and the process proceeds to step S16.

In step S16, a signal of the sound sensor 75 is collected by the information collecting device 85 at sampling cycle and detection time determined by the detectable frequency. At the same time, information of the operation valves 76 to 78 is also collected and the process proceeds to step S17.

In step S17, an RMS value of the collected signal is compared with a reference value which was measured at the time of normal condition in advance with each other, it is determined whether the states of the path and the sound sensor 75 are normal or abnormal depending on whether the RMS value is in a set range, or the RMS value is excessively high or excessively low, and the process proceeds to step S18.

In step S18, it is determined which one of the bearings 21 to 23 has been detected based on information of the first to third operation valves 76 to 78 and the seventh and eight operation valves 151 and 152, and if the detection has not yet been completed, the process returns to step S11, and if the detection has been completed, the process proceeds to step S19.

In step S19, if all of data sets are collected, it is detected which path or device is in an abnormal state.

In a table shown in FIG. 9, paths of first line, second line and third line are paths from the reference signal generating device 132 to the sound sensor 75 through the bearings 21 to 23, and the paths of first line, second line and third line includes the first to third detection sound propagation paths 71 to 73, respectively.

In CASE 1, since the detection data of the paths of first line, second line and third line of the bearings 21 to 23 are normal, it is determined that abnormal condition is not generated. In CASE 5, the detection data of the path of first line is abnormal, and detection data of the paths of second and third lines are normal. Thus, it is determined that abnormality is generated on the side of the sound sensor 75 of the path of first line.

If step S19 is completed, the operation is completed, and if all of paths and devices are normal, data which was collected by this detection is rewritten as reference data. The operation of a flowchart in FIG. 8 may be detected when the main shaft 11 before the main shaft device is operated is not rotating, or the operation may be detected when the main shaft 11 is not rotating even during operation, and the reference data may be obtained.

In the third embodiment, also, the pipe forming the path preferably has three layers. If reference data obtained by the flowchart shown in FIG. 8 is used for diagnosis of the bearings 21 to 23, it is possible to diagnose reliably even when the main shaft device, sound sensor 75, and the path are changed with time or when environment change around the device is generated. Similar to the flowchart shown in FIG. 4, this can be done by comparing the detection data of the sound sensor 75 and the reference data with each other when the diagnosis of the main shaft device is started and the bearings 21 to 23 are diagnosed.

In the third embodiment, although the sound sensor 75 whose detectable frequency is near the specific frequency of 20 kHz or higher is used, a sensor having detectable frequency of a few Hz to a few tens of kHz may be used. In that case, a reference signal generating device 132 suitable for that sensor is used. In the third embodiment, although one sound sensor 75 is mounted, a plurality of sound sensors 75 may be mounted. In that case, if the detectable frequency is different, a reference signal generating device 132 suitable for the device is added.

Fourth Embodiment

Next, a fourth embodiment will be described. In the fourth embodiment, lubricant oil can be supplied to and discharged from the bearings 21 to 23 shown in the third embodiment.

Figure 10:
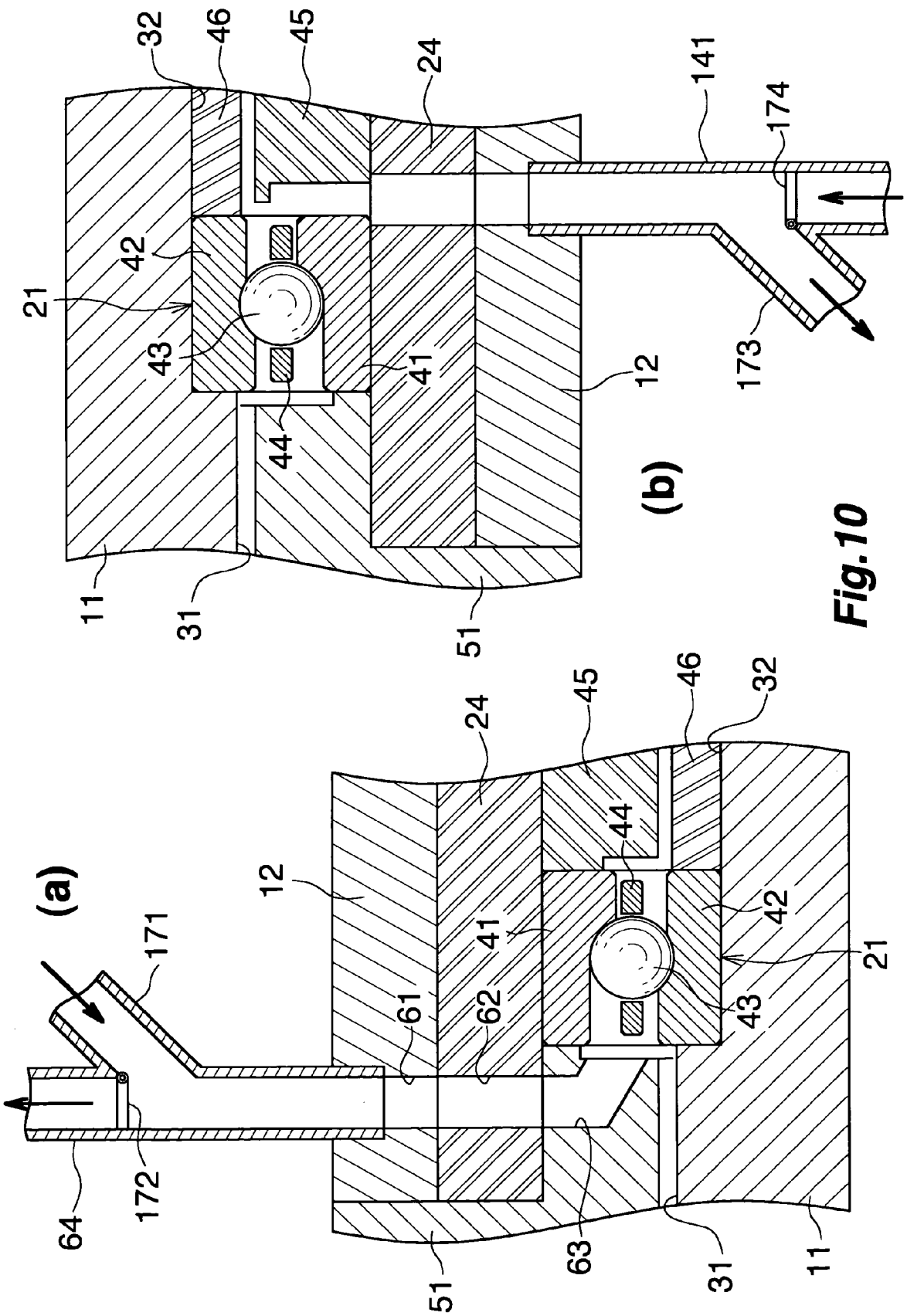
FIGS. 10A and 10B are enlarged views of a bearing of a fourth embodiment.

Referring to FIG. 10A, a lubricant oil supply pipe 171 merges with the first pipe 64 extending from the first bearing 21 upward. A portion extending from the merging portion between the first pipe 64 and the lubricant oil supply pipe 171 toward the first pipe 64 is provided with a ninth open/close device valve 172.

Referring to FIG. 10B, the eighth pipe 142 extends downward from the first bearing 21, and the lubricant oil discharge pipe 173 is branched off from an intermediate portion of the eighth pipe 142. A portion extending toward the eighth pipe 142 from the branched portion between the eighth pipe 142 and the lubricant oil discharge pipe 173 is provided with a tenth open/close device valve 174.

If the ninth open/close device valve 172 and the tenth open/close device valve 174 are opened or closed, any one of the sound propagation path and the lubricant oil path is brought into communication with the first bearing 21. With this configuration, a sound is transmitted to the first bearing 21, or lubricant oil is supplied or discharged.

In the fourth embodiment, a path through which lubricant oil is supplied, a path through which sound of the bearings 21 to 23 is transmitted, a path through which lubricant oil is discharged and a path through which a reference signal is sent to the bearing are commonly used. Therefore, the path can be simplified. In the fourth embodiment, the path through which lubricant oil is supplied and the path through which sound is transmitted to the bearings 21 to 23 are the same, and the path through which lubricant oil is discharged and the path through which a reference signal is sent to the bearings 21 to 23 are the same, but opposite structure may be employed. A structure in which the path through which lubricant oil is supplied and the path through which sound is transmitted to the bearings 21 to 23 are the same, and a structure in which the path through which lubricant oil is discharged and the path through which a reference signal is sent to the bearings 21 to 23 are the same may be combined in the same device, or one of the structures may be utilized.

In the first to fourth embodiments, if a sensor capable of measuring a temperature is mounted in the path provided near the bearing which was adjusted to detect a sound of the specific frequency and the path provided near the bearing which was adjusted to transmit the reference signal and the temperature of air in the path in which a sound is transmitted is measured, a sound transmitted from the bearings 21 to 23 or a value of the reference signal to be transmitted to the bearings 21 to 23 can be adjusted in accordance with temperature variation in each path. For example, a sensor capable of detecting a temperature is mounted in the tube constituting the path and a temperature is detected. When resonance of columnar in the path is utilized, since the velocity of sound is changed by temperature change of air, if the lengths of the paths are the same, frequency at the time of resonance is varied and thus, a value detected by the sensor is changed. When it is not preferable that frequency to be detected is varied, the position of the sensor is moved in the longitudinal direction of the path, or the length of the path is changed.

The invention claimed is:

1. A bearing state diagnostic apparatus comprising:
a cylindrical support body,
at least one bearing supported in the support body,
at least one sound sensor for detecting a sound generated by the at least one bearing and for generating a signal based on the detected sound, wherein the at least one sound sensor is disposed at a position separated away from the outer surface of the support body and away from a vicinity of the at least one bearing,
a detection sound propagation path providing communication between the at least one bearing and the at least one sound sensor, wherein the detection sound propagation path comprises a through hole formed in the cylindrical support body and a pipe connected to the through hole, through which sound generated by the bearing is propagated for detection by the at least one sound sensor,
state diagnostic apparatus for comparing the signal from the sound sensor with data representing normal operation of the at least one bearing and diagnosing the state of the at least one bearing based on the comparison.

2. The bearing state diagnostic apparatus according to claim 1, wherein the number of the bearing is two or more, the number of the sound sensor is one, and the number of the detection sound propagation path is the same as the number of bearings.

3. The bearing state diagnostic apparatus according to claim 2, further comprising a switching unit which switches between detection sound propagation paths for selection of any one of the detection sound propagation paths.

4. The bearing state diagnostic apparatus according to claim 1, wherein the number of the bearing is one, the number of the sound sensor is two or more, and the number of the detection sound propagation path is the same as the number of sound sensors.

5. The bearing state diagnostic apparatus according to claim 4, wherein each of the sound sensors detects sounds in a frequency band different from the other sound sensors.

6. The bearing state diagnostic apparatus according to claim 1, wherein there are a plurality of pairs of bearings and sound sensors, and the number of the detection sound propagation path is the same as the number of pairs of the bearing and sound sensor.

7. The bearing state diagnostic apparatus according to claim 1, wherein the pipe is of multiple-layer structure including at least one of a vibration isolation material layer and a heat insulator layer.

8. The bearing state diagnostic apparatus according to claim 1, further comprising a temperature sensor which detects a temperature in the detection sound propagation path.

9. The bearing state diagnostic apparatus according to claim 1, further comprising a signal generating unit which generates a sound of specific frequency as a reference signal of the sound sensor, and a propagating unit which propagates a sound generated by the signal generating unit to the bearing.

10. The bearing state diagnostic apparatus according to claim 9, wherein the propagating unit includes a signal sound propagation path, lubricant oil is supplied to the bearing from one of the detection sound propagation path and the signal sound propagation path, and lubricant oil supplied to the bearing is discharged from the other one of the detection sound propagation path and signal sound propagation path.

11. The bearing state diagnostic apparatus according to claim 10, further comprising a temperature sensor which detects a temperature in the signal sound propagation path.

\* \* \* \* \*